US012289122B2

(12) United States Patent
Ma et al.

(10) Patent No.: US 12,289,122 B2
(45) Date of Patent: Apr. 29, 2025

(54) DYNAMIC ANTENNA TUNER SETTING BY A WIRELESS DEVICE

(71) Applicant: Apple Inc., Cupertino, CA (US)

(72) Inventors: Kexin Ma, San Diego, CA (US); Zhengbo Zhu, San Diego, CA (US); Alex Yee Kit Ho, San Jose, CA (US); Mei Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 424 days.

(21) Appl. No.: 17/930,054

(22) Filed: Sep. 6, 2022

(65) Prior Publication Data

US 2024/0080049 A1    Mar. 7, 2024

(51) Int. Cl.
*H04B 1/00* (2006.01)
*H04B 17/309* (2015.01)
*H04W 88/06* (2009.01)

(52) U.S. Cl.
CPC ......... *H04B 1/0064* (2013.01); *H04B 17/309* (2015.01); *H04W 88/06* (2013.01)

(58) Field of Classification Search
CPC .............................. H04B 1/0064; H04B 17/309
See application file for complete search history.

(56) References Cited

U.S. PATENT DOCUMENTS

| 10,623,946 | B1* | 4/2020 | Kumar | H04W 76/16 |
| 11,751,042 | B2* | 9/2023 | Poornachandran | H04L 45/302 |
| | | | | 455/432.1 |
| 2016/0050590 | A1* | 2/2016 | Ponukumati | H04W 36/00835 |
| | | | | 455/437 |
| 2021/0006963 | A1* | 1/2021 | Chauhan | H04L 1/0026 |
| 2021/0120524 | A1* | 4/2021 | Palle | H04W 68/005 |
| 2021/0282206 | A1* | 9/2021 | Zhu | H04L 5/0023 |
| 2023/0254918 | A1* | 8/2023 | Gurumoorthy | H04W 8/24 |
| | | | | 455/435.1 |

* cited by examiner

*Primary Examiner* — David Bilodeau
(74) *Attorney, Agent, or Firm* — DICKINSON WRIGHT RLLP

(57) ABSTRACT

Embodiments described herein include methods and apparatus for dynamically selecting antenna settings for reception of wireless signals in multiple radio frequency band by wireless devices. A wireless device includes at least two SIM/eSIM profiles that each use different radio frequency bands and dynamically selects an antenna tuner setting based on requirements of one or more applications in use and key radio frequency performance indicators. In some embodiments, the antenna hardware tuner setting is selected to improve paging reception for a secondary SIM/eSIM from a second cellular wireless network when applications communicating using a first SIM/eSIM via a first cellular wireless network can accommodate performance degradation for a period of time.

20 Claims, 9 Drawing Sheets

DYNAMIC ANTENNA TUNER SETTING BY A WIRELESS DEVICE

FIELD

The described embodiments relate to wireless communications, including methods and apparatus for dynamically selecting antenna settings for reception of wireless signals in multiple radio frequency bands by wireless devices. A wireless device can include at least two SIM/eSIM profiles that each use different radio frequency bands and can select an antenna tuner setting dynamically based on requirements of one or more applications in use and key radio frequency performance indicators.

BACKGROUND

Newer generation, fifth generation (5G), cellular wireless networks that implement one or more $3^{rd}$ Generation Partnership Project (3GPP) standards are rapidly being developed and deployed by mobile network operators (MNOs) worldwide. In addition, sixth generation (6G) standards are in active development. The newer cellular wireless networks provide a range of packet-based services, with 5G (and 6G) technology providing increased data throughput and lower latency connections that promise enhanced mobile broadband services for 5G-capable (and 6G-capable) wireless devices. Wireless local area networks, such as Wi-Fi networks, additionally provide access to communication network services, including cellular based services, such as Wi-Fi calling. Access to cellular services provided by an MNO, including access via a non-cellular wireless network such as Wi-Fi, by a wireless device can require access to cellular credentials and/or secure processing provided by a secure element (SE), such as a universal integrated circuit card (UICC) or an embedded UICC (eUICC) included in the wireless device.

Typically, wireless devices have been configured to use removable UICCs, that include at least a microprocessor and a read-only memory (ROM), where the ROM is configured to store an MNO profile, also referred to as subscriber identity module (SIM) or SIM profile, which the wireless device can use to register and interact with an MNO to obtain wireless services via a cellular wireless network. The SIM profile hosts subscriber data, such as a digital identity and one or more cryptographic keys, to allow the wireless device to communicate with a cellular wireless network. Typically, a UICC takes the form of a small removable card, commonly referred to as a SIM card or physical SIM (pSIM) card, which can be inserted into a UICC-receiving bay of a mobile wireless device. In more recent implementations, UICCs are being embedded directly into system boards of wireless devices as eUICCs, which can provide advantages over traditional, removable UICCs. The eUICCs can include a rewritable memory that can facilitate installation, modification, and/or deletion of one or more electronic SIMs (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices. The use of multiple SIMs and/or eSIMs is expected to offer flexibility for access to multiple services of multiple wireless networks.

A multi-SIM/eSIM wireless device can register for access to wireless services of one or more cellular wireless networks using two different SIMs/eSIMs in parallel. In some cases, the two SIMs/eSIMs can be associated with cellular wireless networks that use different radio access technologies (RATs), such as a 4G Long Term Evolution (LTE) cellular wireless network and a 5G new radio (NR) cellular wireless network, which can operate using different radio frequency (RF) bands. In some cases, the two SIMs/eSIMs can be associated with cellular wireless networks that use different radio frequency (RF) bands of a single RAT, such as a 5G frequency range 1 (FR1) RF band and a 5G frequency range 2 (FR2) RF band. Statically tuning antenna hardware of the multi-SIM/eSIM wireless device to favor reception for one of the RF bands can disadvantage reception via the other RF band. There exists a need to select dynamically an antenna hardware tuner setting to account for different requirements by the multi-SIM/eSIM wireless device.

SUMMARY

The described embodiments relate to wireless communications, including methods and apparatus for dynamically selecting antenna settings for reception of wireless signals in multiple radio frequency bands by wireless devices. A wireless device can include at least two SIM/eSIM profiles that each use different radio frequency bands and can select an antenna tuner setting dynamically based on requirements of one or more applications in use and key radio frequency performance indicators.

A multi-SIM/eSIM wireless device can include multiple SIMs/eSIMs associated with one or more cellular wireless networks. The multi-SIM/eSIM wireless device can be configured to operate in a dual-SIM dual standby (DSDS) mode, in which one transceiver is available for active connections with a first cellular wireless network using a first SIM/eSIM and an additional receiver is available to measure signals and/or monitor pages for a second SIM/eSIM from a second cellular wireless network in parallel. In some embodiments, the multi-SIM/eSIM wireless device can be configured to operate in a dual-SIM dual active (DSDA) mode with two transceivers available for parallel connections to two separate cellular wireless networks associated with two different SIMs/eSIMs. A user can designate one of the multiple SIMs/eSIMs of the multi-SIM/eSIM device as a primary SIM/eSIM, and another SIM/eSIM as a secondary SIM/eSIM. The primary SIM/eSIM is preferred for voice and data connections for applications in use on the multi-SIM/eSIM wireless device. In some embodiments, the primary SIM/eSIM is designated as a default data SIM, while the secondary SIM/eSIM is designated as a non-default data SIM. Select wireless circuitry of the multi-SIM/eSIM wireless device, such as antenna hardware, can be shared between different receivers (or transceivers). The antenna hardware can be configured for different radio frequency (RF) bands to improve reception of wireless signals. The multi-SIM/eSIM wireless device can store different antenna hardware tuner settings to use with different RF bands individually and with combinations of concurrent RF bands applicable for the cellular wireless networks associated with the SIMs/eSIMs of the multi-SIM/eSIM wireless device. The multi-SIM/eSIM wireless device can select one of the antenna hardware tuner settings to adjust parameters of the antenna hardware based on the SIMs/eSIMs that are active on the multi-SIM/eSIM wireless device and/or on cellular wireless network conditions, e.g., using key radio frequency performance indicators. Exemplary radio frequency performance indicators include signal strength and/or signal quality for serving cells of the primary SIM/eSIM and/or the secondary SIM/eSIM. The multi-SIM/eSIM wireless device selects an antenna hardware tuner setting that allows signal reception of radio frequency bands used by the active SIMs/eSIMs. In some embodiments, the antenna hardware tuner setting is selected to boost receiver performance for the secondary SIM/eSIM, e.g., to improve a paging reception success rate. In some embodiments, the antenna hardware tuner setting is selected to favor reception of radio frequency signals for the secondary SIM/eSIM when the multi-SIM/eSIM wireless device is operating at a periphery of a cell of a cellular wireless network associated with the secondary SIM/eSIM, e.g., when a received signal strength and/or received signal quality fall below associated performance thresholds. In some embodiments, the antenna hardware tuner setting is selected to balance performance for the primary SIM/eSIM and the secondary SIM/eSIM. In some embodiments, the antenna hardware tuner setting is selected based on requirements for one or more applications actively using cellular wireless connections via the primary SIM/eSIM. In some embodiments, the antenna hardware tuner setting is selected to favor all serving cells of the primary SIM/eSIM and the secondary SIM/eSIM. In some embodiments, the antenna hardware tuner setting is selected to favor a primary serving cell of the primary SIM/eSIM and cells of the secondary SIM/eSIM.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
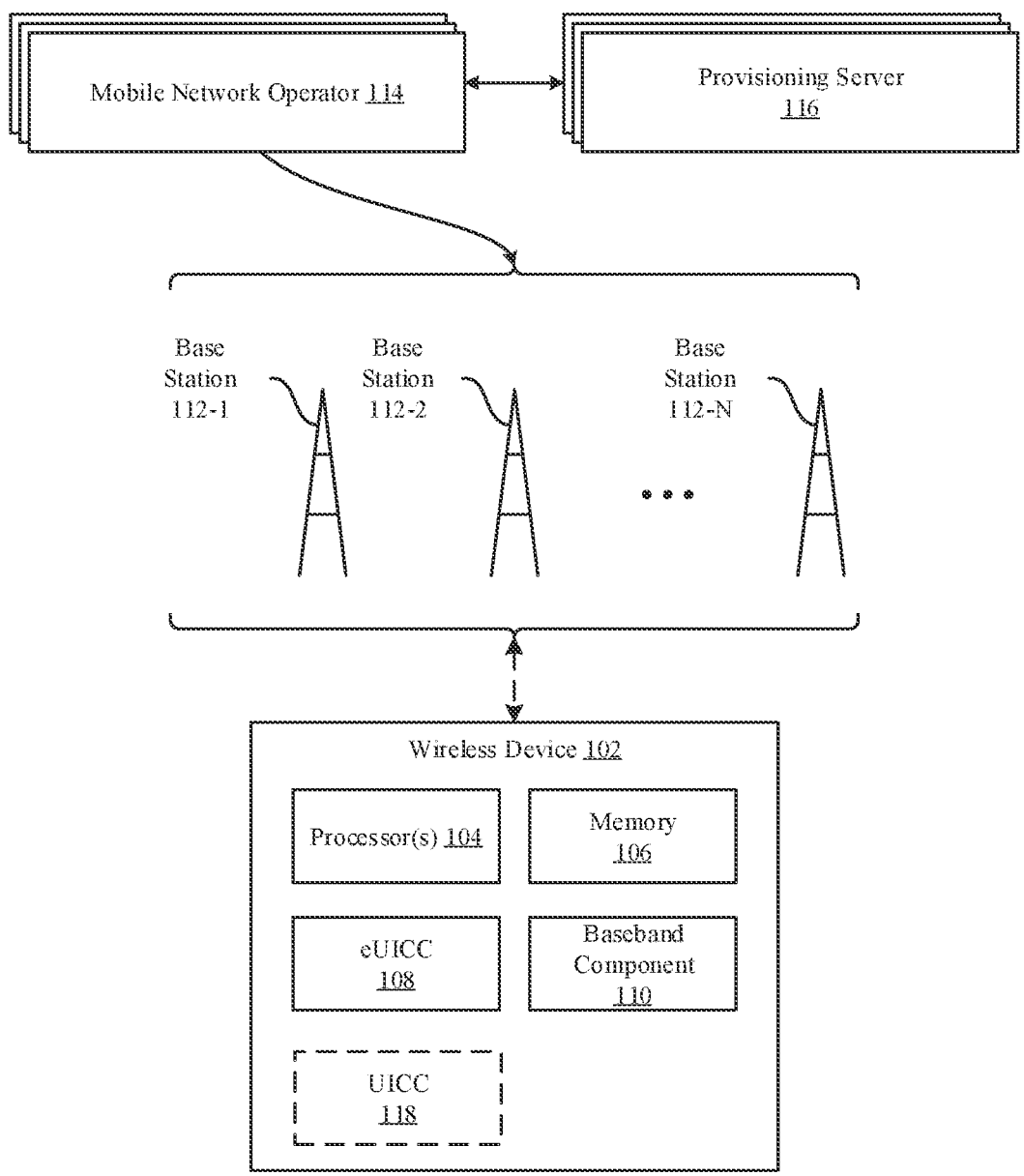
FIG. 1 illustrates a block diagram of different components of an exemplary system configured to implement cellular service access and provisioning for a wireless device, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

The described embodiments relate to wireless communications, including methods and apparatus for dynamically selecting antenna settings for reception of wireless signals in multiple radio frequency bands by wireless devices. A wireless device can include at least two SIM/eSIM profiles that each use different radio frequency bands and can select an antenna tuner setting dynamically based on requirements of one or more applications in use and key radio frequency performance indicators.

A multi-SIM/eSIM wireless device can include multiple SIMs/eSIMs associated with one or more cellular wireless networks, which can use different radio access technologies (RATs), such as a 4G LTE cellular wireless network and a 5G NR cellular wireless network that operate in different radio frequency (RF) bands, or can use a common RAT, e.g., 5G NR, but operate in different RF bands, e.g., FR1 and FR2. The multi-SIM/eSIM wireless device can be configured to operate in a dual-SIM dual standby (DSDS) mode, in which one transceiver is available for active connections with a first cellular wireless network using a first SIM/eSIM and an additional receiver is available to measure signals and/or monitor paging messages for a second SIM/eSIM from a second cellular wireless network in parallel. In some embodiments, the active connections of the first SIM/eSIM can be in a first RF band while the paging message for the second SIM/eSIM can be in a second RF band. In some embodiments, the multi-SIM/eSIM wireless device can be configured to operate in a dual-SIM dual active (DSDA) mode with two transceivers available for parallel connections to two separate cellular wireless networks associated with two different SIMs/eSIMs. The same antenna hardware of the multi-SIM/eSIM wireless device can be used to receive signals from the first cellular wireless network in the first RF band and signals from the second cellular wireless network in the second RF band. The antenna hardware can be tuned to allow for reception from both the first and second RF bands at the same time.

A user can designate one of the multiple SIMs/eSIMs of the multi-SIM/eSIM device as a primary SIM/eSIM, and another SIM/eSIM as a secondary SIM/eSIM. The primary SIM/eSIM is preferred for voice and data connections for applications in use on the multi-SIM/eSIM wireless device. In some embodiments, the primary SIM/eSIM is designated as a default data SIM, while the secondary SIM/eSIM is designated as a non-default data SIM. Select wireless circuitry of the multi-SIM/eSIM wireless device, such as antenna hardware, can be shared between different receivers (or transceivers). RF signals for the primary SIM/eSIM and RF signals for the secondary SIM/eSIM can be simultaneously received via different RF bands using common antenna hardware of the multi-SIM/eSIM wireless device. The antenna hardware can be configured to receive different radio frequency (RF) bands to improve reception of wireless signals across the respective RF bands. Tuning the antenna hardware to favor reception of wireless signals in a first RF band used by the primary SIM/eSIM can negatively impact reception of wireless signals, e.g., paging messages, in a second RF band used by the secondary SIM/eSIM. Moreover, tuning the antenna hardware to balance reception of wireless signals in the first RF band and the second RF band can also impact reception in the second RF band, particularly when the multi-SIM/eSIM wireless device operates at a periphery of a serving cell of the second cellular wireless network associated with the secondary SIM/eSIM. Paging messages for the secondary SIM/eSIM sent by the second cellular wireless network in the second RF band can be missed by the multi-SIM/eSIM wireless device in far cell conditions, when the antenna hardware is not tuned to favor reception of signals in the second RF band. When the antenna hardware is tuned to favor reception of signals in the second RF band, performance of the communication in the first RF band for the primary SIM/eSIM can be impacted. As such, the multi-SIM/eSIM wireless device can seek to balance performance for reception of signals in the second RF band for the secondary SIM/eSIM when required, e.g., low signal strength/quality in the second RF band, and when a minor performance impact on signals in the first RF band for the primary SIM/eSIM can be accommodated, e.g., no high data throughput or uninterruptible applications are using connections of the primary SIM/eSIM in the first RF band.

The multi-SIM/eSIM wireless device can store different antenna hardware tuner settings to use with different RF bands individually, e.g., when only one SIM/eSIM is active and only one RF band is in use, and with various combinations of concurrent RF bands applicable for the cellular wireless networks associated with the SIMs/eSIMs of the multi-SIM/eSIM wireless device, e.g., when two SIMs/eSIMs are concurrently active and use distinct RF bands. The multi-SIM/eSIM wireless device can select one of the stored antenna hardware tuner settings to adjust parameters of the antenna hardware based on the SIMs/eSIMs that are active on the multi-SIM/eSIM wireless device. The multi-SIM/eSIM wireless device can also account for applications that are in use via the SIMs/eSIMs and measurements or estimates of reception of signals from the cellular wireless networks. The multi-SIM/eSIM wireless device can determine an antenna hardware tuner setting to use based on key performance metric indicators, such as signal strength, e.g., a reference signal received power (RSRP) value, and/or signal quality, e.g., a signal-to-noise-plus-interference ratio (SINR) value, for serving cells of the first cellular wireless network associated with the primary SIM/eSIM and/or the second cellular wireless network associated with the secondary SIM/eSIM. The multi-SIM/eSIM wireless device can adjust the antenna hardware by changing settings for the antenna hardware based on real-time (or near real-time) information to improve overall performance for communication via active SIMs/eSIMs.

The multi-SIM/eSIM wireless device selects an antenna hardware tuner setting that covers radio frequency bands used by active SIMs/eSIMs on the multi-SIM/eSIM wireless device. In some embodiments, the antenna hardware tuner setting is selected to boost performance for a secondary SIM/eSIM to improve a paging reception success rate. In some embodiments, the antenna hardware tuner setting is selected to favor reception of signals for the secondary SIM/eSIM when the multi-SIM/eSIM wireless device is operating at a periphery of a cell of a cellular wireless network associated with the secondary SIM/eSIM. In some embodiments, the antenna hardware tuner setting is selected to balance performance for the primary SIM/eSIM and the secondary SIM/eSIM. In some embodiments, the antenna hardware tuner setting is selected based on requirements for one or more applications actively using cellular wireless connections via the primary SIM/eSIM. For example, an application with an active cellular wireless connection using the primary SIM/eSIM and requiring a throughput above a data rate threshold or needing continuity of connection without interruption can be prioritized over reception of paging signals via the secondary SIM/eSIM. In some embodiments, the antenna hardware tuner setting is selected to favor reception for the secondary SIM/eSIM when required for performance of reception of paging messages for the secondary SIM/eSIM and communication via the primary SIM/eSIM can accommodate a reduction in performance for a period of time. In some embodiments, the antenna hardware tuner setting is selected to improve performance of reception for signals from a second cellular wireless network associated with the secondary SIM/eSIM when a first key performance indicator for the first cellular wireless network associated with the primary SIM/eSIM is above a first performance threshold, a second key performance indicator for the second cellular wireless network is below a second performance threshold, and all applications with active cellular wireless connections to the first cellular wireless network allow for a reduction in data throughput for a period of time. In some embodiments, the antenna hardware tuner setting is selected to favor reception of RF bands used by serving cells of the secondary SIM/eSIM over RF bands used by serving cells of the primary SIM/eSIM. In some embodiments, the antenna hardware tuner setting is selected to favor reception of RF bands for all serving cells of the primary SIM/eSIM and the secondary SIM/eSIM. In some embodiments, the antenna hardware tuner setting is selected to favor reception of RF bands for a primary serving cell of the primary SIM/eSIM and for RF bands used by serving cells of the secondary SIM/eSIM.

These and other embodiments are discussed below with reference to FIGS. 1 through 7; however, those skilled in the art will readily appreciate that the detailed description given herein with respect to these figures is for explanatory purposes only and should not be construed as limiting.

FIG. 1 illustrates a block diagram of different components of a system 100 that includes i) a wireless device 102, which can also be referred to as a mobile wireless device, a cellular wireless device, a wireless communication device, a mobile device, a user equipment (UE), a device, a primary wireless device, a secondary wireless device, an accessory wireless device, a cellular-capable wearable device, and the like, ii) a group of base stations 112-1 to 112-N, which are managed by different Mobile Network Operators (MNOs) 114, and iii) a set of provisioning servers 116 that are in communication with the MNOs 114. The wireless device 102 can represent a mobile computing device (e.g., an iPhone®, an iPad®, or an Apple Watch® by Apple®), the base stations 112-1 to 112-N can represent cellular wireless network entities including fourth generation (4G) Long Term Evolution (LTE) evolved NodeBs (eNodeBs or eNBs), fifth generation (5G) NodeBs (gNodeBs or gNBs), and/or sixth generation (6G) NodeBs that are configured to communicate with the mobile wireless device 102, and the MNOs 114 can represent different wireless service providers that provide specific services (e.g., voice, data, video, messaging) to which a user of the wireless device 102 can subscribe to access the services via the wireless device 102. Applications resident on the wireless device 102 can advantageously access services using 4G LTE connections, 5G connections, and/or 6G connections (when available) via the base stations 112. The wireless device 102 can include processing circuitry, which can include one or more processors 104 and a memory 106, an embedded Universal Integrated Circuit Card (eUICC) 108, and a baseband component 110. In some embodiments, the wireless device 102 can include one or more universal integrated circuit cards (UICCs) 118, also referred to as physical SIM cards, each UICC 118 including a SIM, in addition to or in place of the eUICC 108 providing one or more electronic SIMs (eSIMs). The one or more processors 104 can include one or more wireless processors, such as a cellular baseband component, a wireless local area network processor, a wireless personal area network processor, a near-field communication processor, and one or more system-level application processors. The components of the wireless device 102 work together to enable the wireless device 102 to provide useful features to a user of the wireless device 102, such as cellular wireless network access, non-cellular wireless network access, localized computing, location-based services, and Internet connectivity. The eUICC 108 can be configured to store multiple eSIMs for accessing services offered by one or more different MNOs 114 via communication through base stations 112-1 to 112-N. To be able to access services provided by the MNOs, one or more eSIMs can be provisioned to the eUICC 108 of the mobile wireless device 102. The wireless device 102 can include wireless circuitry, including the baseband component 110 and at least one transmitter/receiver, also referred to as a transceiver. In some embodiments, the wireless device 102 includes two or more transceivers. In some embodiments, the wireless device 102 can be configured to operate in a dual SIM dual standby (DSDS) mode, with two SIMs, one SIM and one eSIM, or two eSIMs enabled and active simultaneously, but allowing connections to only one cellular wireless network via a single, active transceiver at a time. In some embodiments, the wireless device 102 can be configured to operate in a dual SIM dual active (DSDA) mode, with two SIMs, one SIM and one eSIM, or two eSIMs enabled and active, and allowing cellular connections to two cellular wireless networks via two active transceivers simultaneously.

Figure 2:
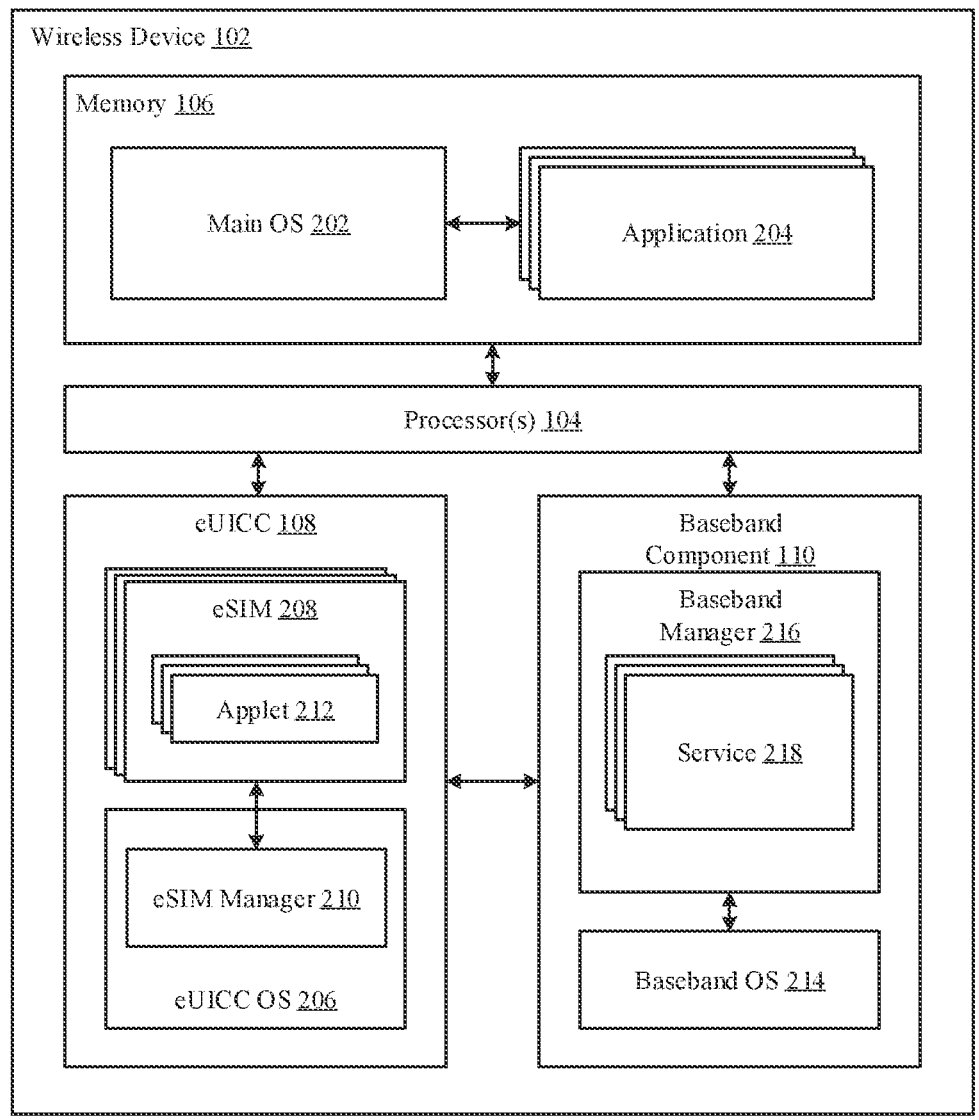
FIG. 2 illustrates a block diagram of a more detailed view of exemplary components of a mobile wireless device of the system of FIG. 1, according to some embodiments.

FIG. 2 illustrates a block diagram 200 of a more detailed view of exemplary components of a wireless device 102 of the system 100 of FIG. 1. The one or more processors 104, in conjunction with the memory 106, can implement a main operating system (OS) 202 that is configured to execute applications 204 (e.g., native OS applications and user applications). The one or more processors 104 can include applications processing circuitry and, in some embodiments, wireless communications control circuitry. The applications processing circuitry can monitor application requirements and usage to determine recommendations about communication connection properties, such as bandwidth and/or latency, and provide information to the communications control circuitry to determine suitable wireless connections for use by particular applications. The communications control circuitry can process information from the applications processing circuitry as well as from additional circuitry, such as the baseband component 110, and other sensors (not shown) to determine states of components of the mobile wireless device 102, e.g., reduced power modes, as well as of the mobile wireless device 102 as a whole, e.g., mobility states, activity/inactivity states. The mobile wireless device 102 further includes an eUICC 108 that can be configured to implement an eUICC OS 206 to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, updating, or otherwise performing management of the eSIMs 208 within the eUICC 108 and providing the baseband component 110 with access to the eSIMs 208 to provide access to wireless services for the mobile wireless device 102. The eUICC OS 206 can include an eSIM manager 210, which can perform management functions for various eSIMs 208. Each eSIM 208 can include a number of applets 212 that define the manner in which the eSIM 208 operates. For example, one or more of the applets 212, when implemented by the baseband component 110 and the eUICC 108, can be configured to enable the mobile wireless device 102 to communicate with an MNO 114 and provide useful features (e.g., phone calls and internet) to a user of the mobile wireless device 102.

A baseband component 110 of the mobile wireless device 102 can include a baseband OS 214 that is configured to manage hardware resources of the baseband component 110 (e.g., a processor, a memory, different radio components, etc.). The baseband component 110 can also be referred to as a wireless baseband component, a baseband wireless processor, a cellular baseband component, a cellular component, and the like. According to some embodiments, the baseband component 110 can implement a baseband manager 216 that is configured to interface with the eUICC 108 to establish a secure channel with a provisioning server 116 and obtain information (such as eSIM data) from the provisioning server 116 for purposes of managing eSIMs 208. The baseband manager 216 can be configured to implement services 218, which represent a collection of software modules that are instantiated by way of the various applets 212 of enabled eSIMs 208 that are included in the eUICC 108. For example, services 218 can be configured to manage different connections between the mobile wireless device 102 and MNOs 114 according to the different eSIMs 208 that are enabled within the eUICC 108.

Figure 3A:
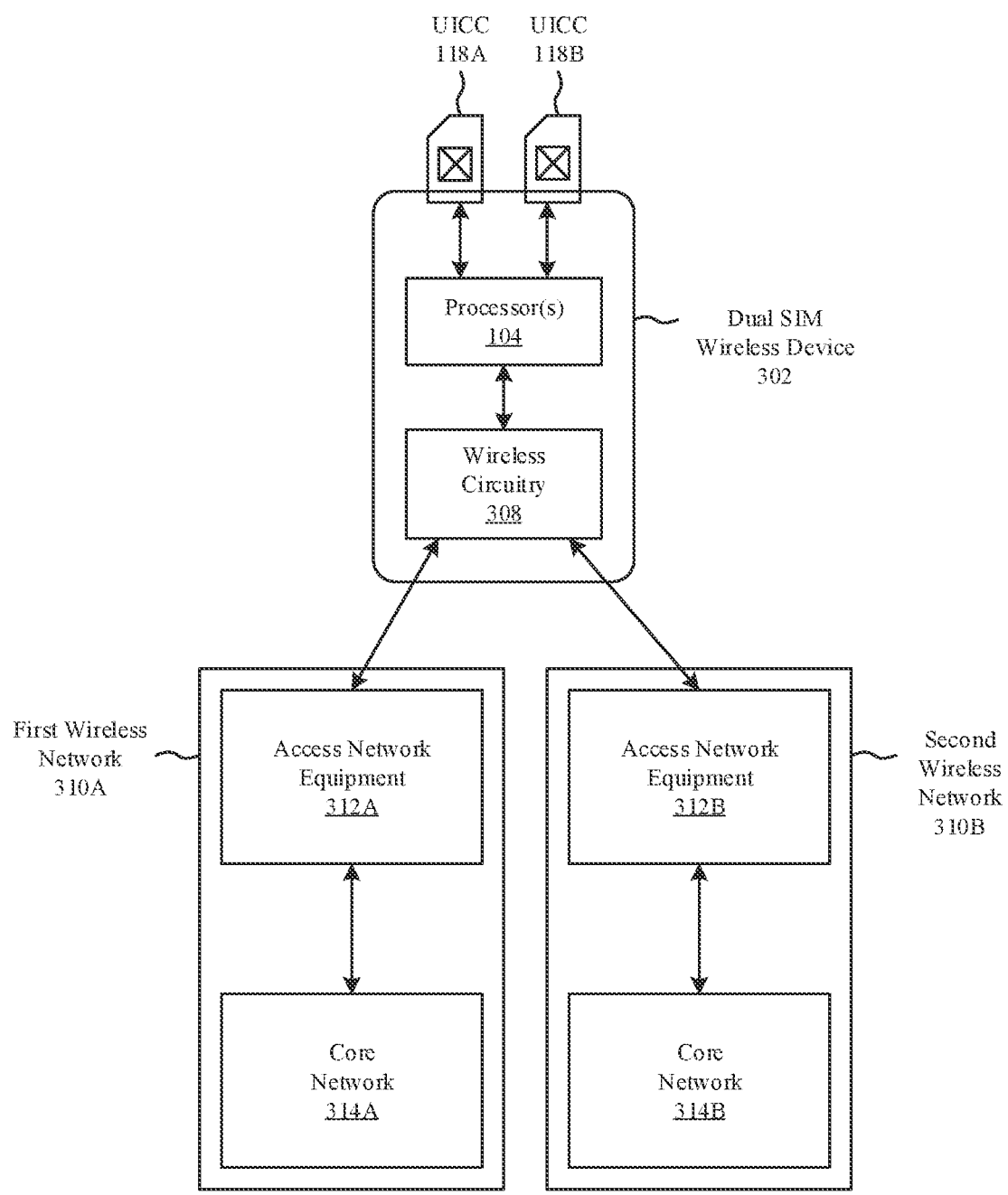
FIG. 3A illustrates a block diagram of an exemplary dual SIM wireless device in communication with two different wireless networks, according to some embodiments.

FIG. 3A illustrates a block diagram 300 of components of an exemplary dual SIM wireless device 302 including one or more processor(s) 104 and wireless circuitry 308 that provides for wireless radio frequency (RF) connections between the dual SIM wireless device 302 and a first wireless network 310A and a second wireless network 310B. In some embodiments, the wireless circuitry 308 includes one or more baseband component(s) 110, and a set of RF analog front-end circuitry. In some embodiments, the wireless circuitry 308 and/or a portion thereof can include or be referred to as a wireless transmitter/receiver or a transceiver or a radio. The terms circuit, circuitry, component, and component block may be used interchangeably herein, in some embodiments, to refer to one or more operational units of a wireless device that process and/or operate on digital signals, analog signals, or digital data units used for wireless communication. For example, representative circuits can perform various functions that convert digital data units to transmitted radio frequency analog waveforms and/or convert received analog waveforms into digital data units including intermediate analog forms and intermediate digital forms. The wireless circuitry 308 can include components of RF analog front-end circuitry, e.g., a set of one or more antennas, which can be interconnected with additional supporting RF circuitry that can include filters and other analog components that can be "configured" for transmission and/or reception of analog signals via one or more corresponding antennas to one or more of the first and second wireless networks 310A/B. The processor(s) 104 and the wireless circuitry 308 can be configured to perform and/or control performance of one or more functionalities of the dual SIM wireless device 302, in accordance with various implementations. The processor(s) 104 and the wireless circuitry 308 can provide functionality for coordinating hardware/software resources in the dual SIM wireless device 302 to improve performance and reduce power consumption for mobility management of connections to one or more of the wireless networks 310A/B.

The dual SIM wireless device 302 includes two removable UICCs 118A/B, which can be inserted and removed from the dual SIM wireless device 302 together or independently. Each UICC 118A/B includes at least one software identity module (SIM), which can be embodied as a software/firmware program installed on the UICC 118A/B. Removable UICCs 118A/B can provide a user of the dual SIM wireless device 302 the ability to replace a UICC to change services, provided the dual SIM wireless device 302 supports such flexibility (e.g., an "unlocked" device that is not "locked" to a particular wireless network operator or service provider). Hardware complexity and/or a size of a wireless device can limit the ability to include multiple UICC slots, and thus additional arrangements for wireless devices are can include multiple SIMs on a single UICC 118 and/or eSIMs 208 on an eUICC 108 or combinations thereof. The dual SIM wireless device 302, in some embodiments, can register with two different wireless networks, e.g., the first and second wireless networks 310A/B, simultaneously. The first wireless network 310A can operate in accordance with a first wireless communication protocol, e.g., a 5G NR wireless communication protocol, while the second wireless network 310B can operate with a second wireless communication protocol that can be the same as the first wireless communication protocol or a different wireless communication protocol, e.g., a 4G LTE wireless communication protocol. The first and second wireless networks 310A/B can operate using different radio frequency bands in accordance with their respective wireless communication protocols. The first and second wireless network 310A/B can operate using different radio frequency bands of a common wireless communication protocol, e.g., using an FR1 RF band and an FR2 band of a 5G NR wireless communication protocol. The wireless circuitry 308 of the dual SIM wireless device 302 can be configured to register with and/or establish a connection with the first wireless network 310A via access network equipment 312A, which interfaces with a core network 314A. The wireless circuitry 308 of the dual SIM wireless device 302 can also be configured to register with and/or establish a connection with the second wireless network 310B via access network equipment 312B, which interfaces with a core network 314B. In some embodiments, the wireless circuitry 308 of the dual SIM wireless device 302 supports simultaneous transmission and reception to both the first and second wireless networks 310A/B. In some embodiments, the wireless circuitry 308 of the dual SIM wireless device 302 supports transmission and reception to only one of the first and second wireless networks 310A/B at a time. In some embodiments, the wireless circuitry 308 of the dual SIM wireless device 302 supports transmission to only one of the first and second wireless networks 510A/B at a time and reception from one or both of the first and second wireless networks 310A/B. A dual SIM wireless device 302 that can connect to only one wireless network at a time but can monitor and/or receive communication from two wireless networks with which it is registered can be referred to as a "Dual SIM, Dual Standby" (DSDS) wireless device. A dual SIM wireless device 302 that can connect to two wireless networks simultaneously using two different subscriber identities can be referred to as a "Dual SIM, Dual Active" (DSDA) wireless device. In general, the dual SIM wireless device 302 can be referred to as a "DSDx" wireless device, where "x" can indicate either "S" for "standby" or "A" or "active".

Figure 3B:
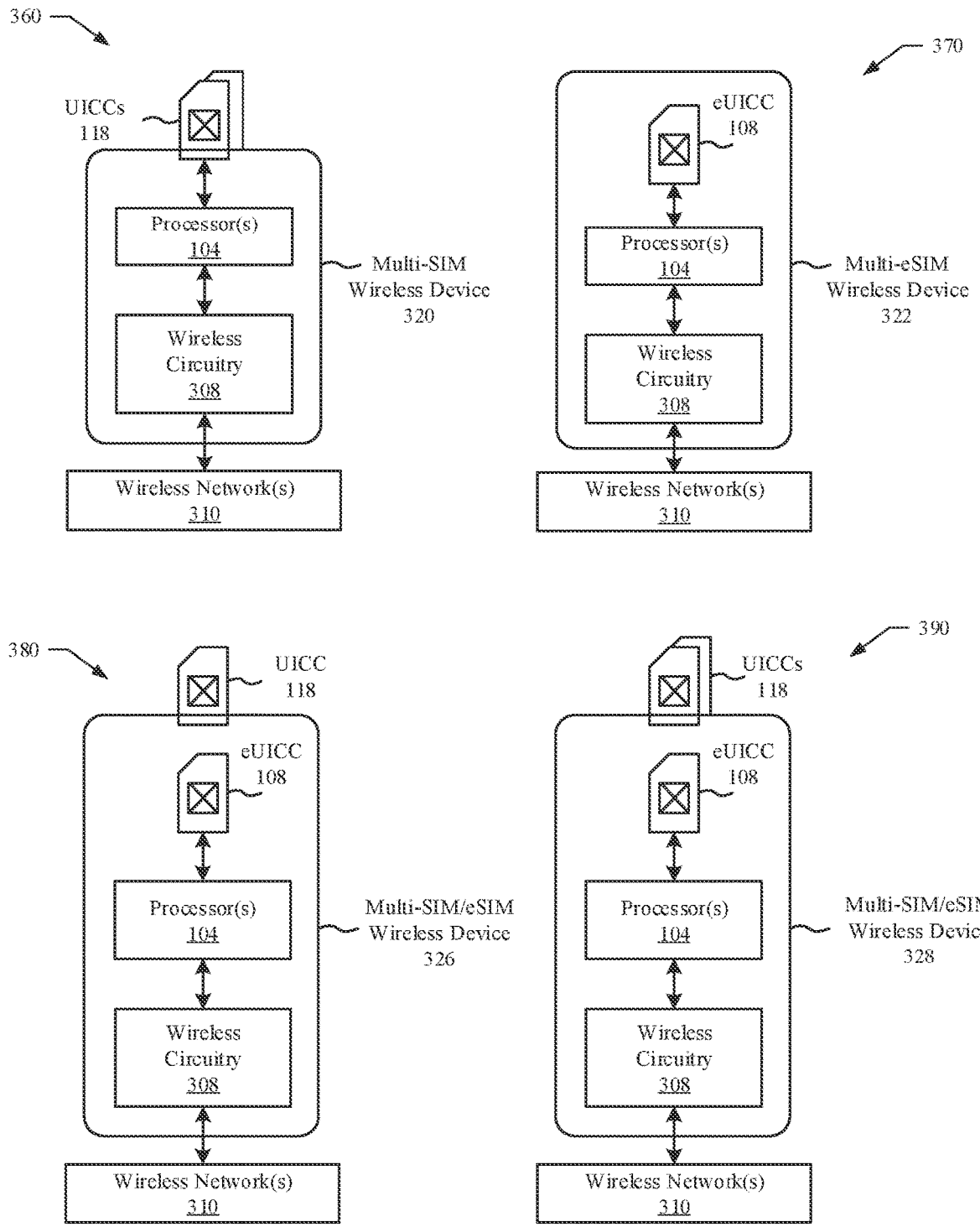
FIG. 3B illustrates block diagrams of exemplary multi-SIM and multi-SIM/eSIM wireless devices, according to some embodiments.

FIG. 3B illustrates diagrams 360, 370, 380, 390 of additional exemplary multi-SIM/eSIM wireless devices 320, 322, 326, 328 that support multiple subscriber identities using removable UICCs 118 and/or eUICCs 108 with SIMs or eSIMs 208 implemented respectively thereon. As illustrated in diagram 360, a multi-SIM wireless device 320 includes multiple UICCs 118, which can be inserted and removed individually or together, and communicate with one or more processors 104 that connect to wireless circuitry 308 that provides for wireless communication with one or more wireless networks 310. As the physical size and design of the multi-SIM wireless device 320 can limit the number of UICCs 118 that can be supported, alternatively as shown by diagram 370, a multi-eSIM wireless device 322 can include an eUICC 108 connected with the processor(s) 104 and to the wireless network(s) 310 via the wireless circuitry 308. The eUICC 108 can be built into the multi-eSIM wireless device 322 and can be not removable from the multi-eSIM wireless device 322, e.g., permanently affixed to a circuit board in the multi-eSIM wireless device 322. The eUICC 108 can be programmed such that one or more eSIMs 208 can be implemented on the eUICC 108. Each eSIM 208 can be associated with a distinct subscriber identity and/or provide distinct services or subscriptions for a user of the multi-eSIM wireless device 322. Diagram 380 illustrates a multi-eSIM/SIM wireless device 326 that includes a removable UICC 118, on which can be installed one or more SIMs, and an eUICC 108 on which one or more eSIMs 208 can be installed. The combination of SIMs on the UICC 118 and/or eSIMs 208 on the eUICC 108 can provide for connections to one or more wireless networks 310 using the wireless circuitry 308 under the control of the processor(s) 104 of the multi-SIM/eSIM wireless device 326. Diagram 390 illustrates another multi-eSIM/SIM wireless device 328 that includes multiple UICCs 118, on which one or more SIMs can be installed, and an eUICC 108, on which one or more eSIMs 208 can be installed. A combination of one or more SIMs on a UICC 118 and/or eSIMs on an eUICC 108 can provide for connections to one or more wireless networks 310 using the wireless circuitry 308 under the control of the processor(s) 104 of the multi-SIM/eSIM wireless device 328. In general, a wireless device 102 that supports multiple subscriber identities can include (i) at an eUICC 108 and/or (ii) one or more UICCs 118. Each UICC 118 can support one or more SIMs, and each eUICC 108 can support one or more eSIMs 208. A wireless device 102 that supports multiple subscriber identities, e.g., 302, 320, 322, 326, 328, can include a combination of SIMs and/or eSIMs 208 to support communication with one or more wireless networks 310.

Figure 4A:
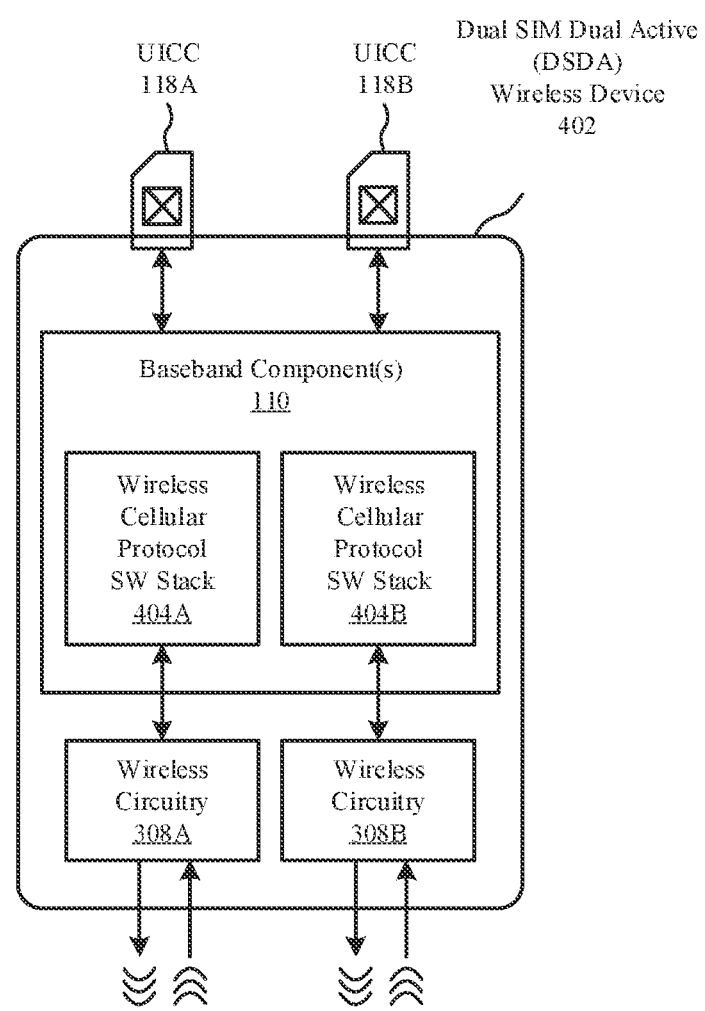
FIG. 4A illustrates a block diagram of an exemplary dual SIM dual active (DSDA) wireless device, according to some embodiments.

FIG. 4A illustrates a diagram 400 of a DSDA wireless device 402 that includes two removable UICCs 118A/B, on which at least two SIMs are installed, e.g., one SIM on each of the UICCs 118A/B. (While the DSDA wireless device 402 illustrated in FIG. 4A includes two UICCs 118A/B, alternative architectures for the DSDA wireless device 402 can include combinations of UICCs 118 and/or an eUICC 108 as discussed herein.) Each UICC 118A/B can communicate with one or more baseband components 110, e.g., via another processor 104 and/or directly. A first wireless cellular protocol software (SW) stack 404A on the one or more baseband component(s) 110 can communicate with a first wireless network 310A (not shown) via wireless circuitry 308A, while a second wireless cellular protocol SW stack 404B can communicate with a second wireless network 310B (not shown) via wireless circuitry 308B. With parallel wireless circuitry 308A/B, the DSDA wireless device 402 can interact with two wireless networks 310A/B independently without requiring an interface or interaction between the wireless cellular protocol SW stacks 304A/B. Each of the wireless cellular protocol SW stacks 304A/B can support communication using one or more wireless communication protocols. With sufficient parallel wireless circuitry 308A/B and parallel wireless cellular protocol SW stacks 304A/B, the DSDA wireless device 402 can be registered with two different wireless networks 310A/B and can form connections with the two different wireless networks 310A/B in parallel and independently. The DSDA wireless device 402 can receive notifications (e.g., paging messages and/or paging indications) from a second wireless network 310B while connected to a first wireless network 310A, as the parallel wireless circuitry 308A/B permits parallel, simultaneous communication to two different wireless networks 310A/B.

Figure 4B:
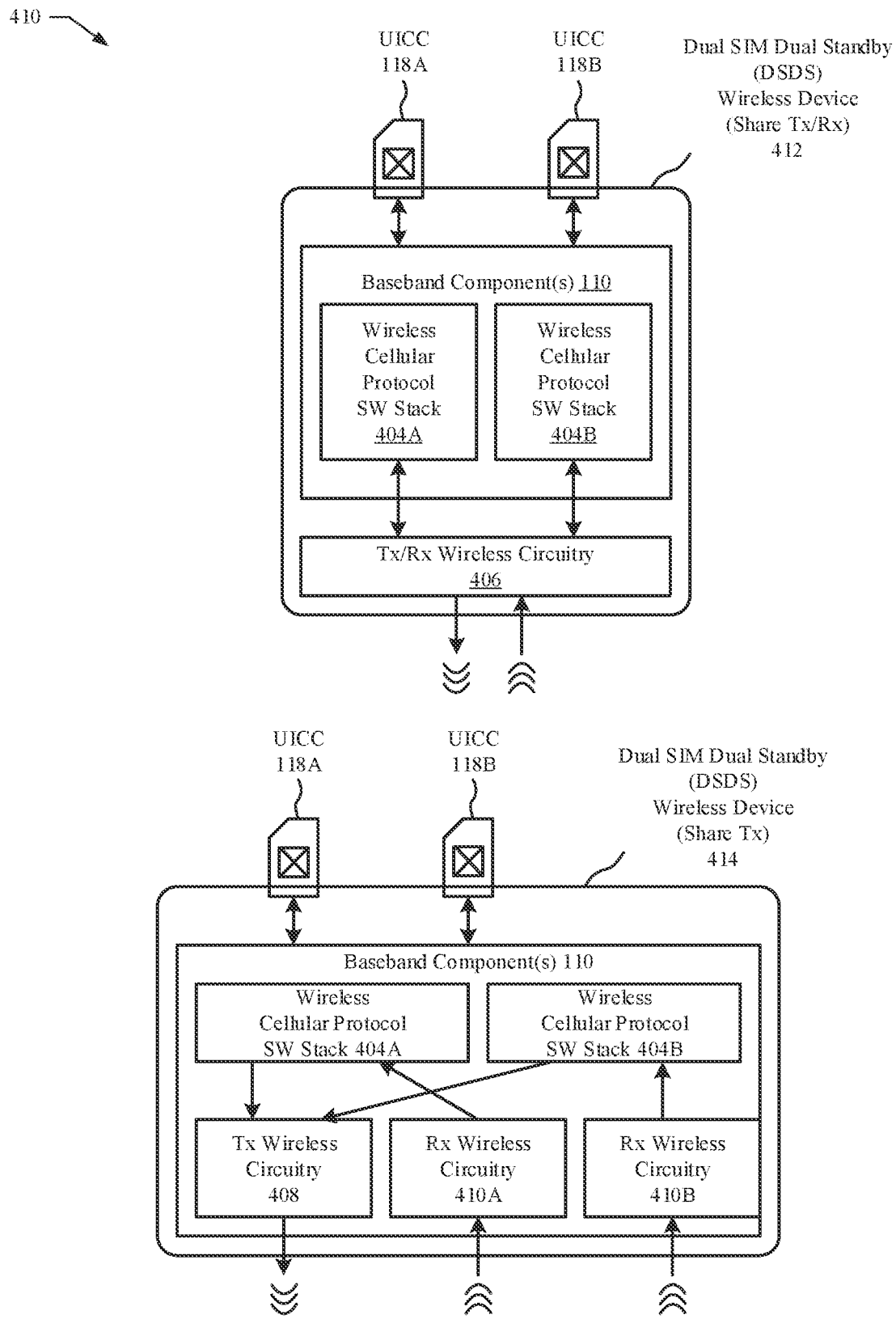
FIG. 4B illustrates block diagrams of exemplary dual SIM dual standby (DSDS) wireless devices, according to some embodiments.

FIG. 4B illustrates a diagram 410 of two exemplary configurations of DSDS wireless devices 412/414. (While the DSDS wireless devices 412/414 illustrated in FIG. 4B include two UICCs 118A/B, alternative architectures for the DSDS wireless devices 412/414 can include combinations of UICCs 118 and/or an eUICC 108 as discussed herein.) A DSDS wireless device 412 includes two removable UICCs 118A/B, on which at least two SIMS are installed, and each UICC 118A/B can communicate with one or more baseband components 110, on which two wireless cellular protocol software stacks 404A/B operate. Each wireless cellular protocol software stack 404A/B can communicate with a respective wireless network 310A/B (not shown) via a set of common transmit/receive (Tx/Rx) wireless circuitry 406. In some embodiments, the set of common Tx/Rx wireless circuitry 406 provides for transmission and/or reception by one wireless cellular protocol SW stack 404A or 404B at a time, and thus the DSDS wireless device 412 can be associated with two (or more) wireless networks 310A/B at the same time but not be able to communicate with both wireless networks 310A/B simultaneously. For example, the DSDS wireless device 412 can be configured to operate in a time division mode that shares the Tx/Rx wireless circuitry 406 among the wireless cellular protocol SW stacks 404A/B. In some embodiments, the wireless cellular protocol SW stacks 404A/B can both operate in an idle mode and listen for paging messages from each of two different wireless networks 310A/B (e.g., alternate listening for paging messages from each wireless network 310A/B by reconfiguring if required the Tx/Rx wireless circuitry 406 to receive signals from each wireless network 310A/B.) The DSDS wireless device 412 can permit connections with two different wireless networks 310A/B using two different subscriber identities but only one connection at any time.

In a second configuration of a DSDS wireless device 414, a shared set of wireless circuitry 408/410A/B provides for one transmit path and two parallel receive paths that can be used simultaneously. Each wireless cellular protocol software stack 404A/B can be configured to transmit via a set of transmit (Tx) wireless circuitry 408, but only one wireless cellular protocol software stack 404A/B can communicate at any one time via the Tx wireless circuitry 408. Both wireless cellular protocol software stacks 404A/B can receive radio frequency wireless signals via respective receive (Rx) wireless circuitry 410A/B in parallel. The DSDS wireless device 414 can share transmit wireless circuitry 408 between two wireless cellular protocol SW stacks 404A/B, while permitting simultaneous reception via dedicated (and/or configurable) receive wireless circuitry 410A/B. The DSDS wireless device 414 can provide for a connection (e.g., bi-directional data and/or signaling communication) with only one wireless network at a time; however, paging messages (or other control signaling) can be received (e.g., in a downlink direction) from two wireless networks 310A/B at the same time. Similarly, the parallel Rx wireless circuitry 410A/B can provide for reception of broadcast channels, signaling channels, synchronization channels, or other signals from two parallel wireless networks, e.g., for measurements of cells, as part of reselection and/or handover processes, when searching for wireless networks with which to establish connections, to perform downlink (DL) synchronization processes, and/or for associating or registering with wireless networks, etc. The DSDS wireless device 414 can be connected to a first wireless network 310A, e.g., in a voice call, data connection, video call, or other bi-directional connection with the first wireless network 310A, and can receive paging messages from a second wireless network 310B at the same time.

Figure 5:
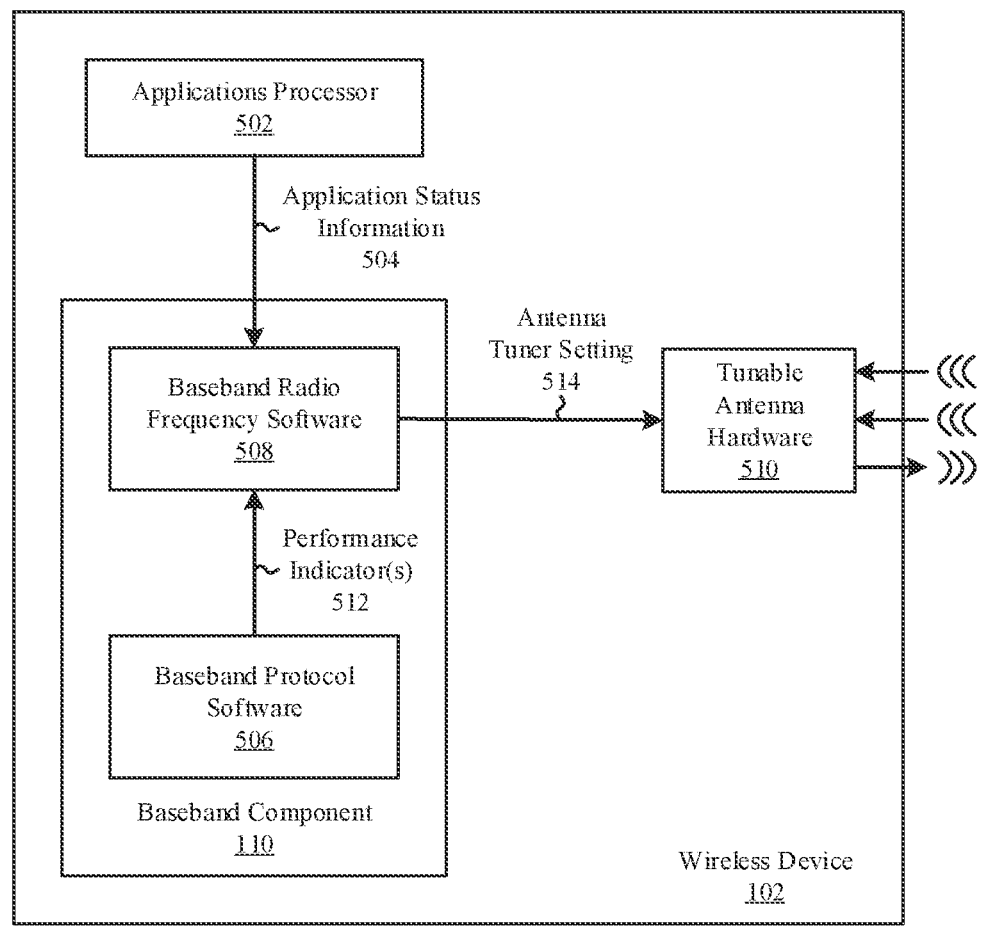
FIG. 5 illustrates a block diagram of exemplary components of a wireless device to implement dynamic antenna tuner setting, according to some embodiments.

FIG. 5 illustrates a diagram 500 of exemplary components of a wireless device 102 configured to dynamically select antenna hardware tuner settings based on application requirements and cellular wireless network performance. The wireless device 102 includes an applications processor 502, which can an exemplary processor of the one or more processors 104 illustrated in FIGS. 1 and 2, configured to execute instructions for applications one or more of which can request wireless data communication connections using credentials from one or more SIMs/eSIMs of the wireless device 102. The applications processor 502 can provide application status information 504 to a baseband radio frequency software module 508 operable on the baseband component 110. Exemplary status information can include information regarding applications that are running and using cellular wireless connections, and/or requirements for performance, reliability, latency, quality of service (QoS) for applications running on the applications processor 502. In some embodiments, the application status information 504 includes an indicator that one or more applications using cellular wireless communication via a first SIM/eSIM of the wireless device 102 can (or cannot) accommodate performance changes or variability, e.g., to allow for performance improvement for reception of signals via a second SIM/eSIM of the wireless device 102. In some embodiments, the application status information 504 includes an indication that at least one application is using a cellular wireless connection via the first SIM/eSIM of the wireless device 102 and requires a high data throughput and/or high reliability that cannot accommodate a reduction in performance via the cellular wireless connection while active. The baseband component 110 can also include a baseband protocol software module 506 that manages physical layer wireless connections of the wireless device 102 in accordance with one or more cellular wireless communication protocols. The baseband protocol software module 506 can monitor signals received from serving cells and neighbor cells of cellular wireless networks and determine key performance indicators 512 for one or more cells of the cellular wireless networks. In some embodiments, the baseband protocol software module 506 provides real-time (or near real-time) key performance indicators 512 characterizing reception of signals for the one or more cells of nearby cellular wireless networks to the baseband radio frequency software module 508. Exemplary key performance indicators 512 can include a signal strength metric, such as a reference signal received power (RSRP) level, or a signal quality metric, such as a signal-to-noise-plus-interference ratio (SINR) value. The baseband radio frequency software module 508 can determine an antenna tuner setting 514 to configure tunable antenna hardware 510 of the wireless device 102 based on the application status information 504 provided by the applications processor and on the performance indicator(s) 512 provided by the baseband protocol software module 506. The baseband radio frequency software module 508 can select an antenna tuner setting 514 from a set of antenna tuner settings stored in the wireless device 102. Each antenna tuner setting 514 can adjust the tunable antenna hardware 510 in accordance with one or more radio frequency (RF) bands to be received via the tunable antenna hardware 510.

In some embodiments, a user of the wireless device 102 can designate one of multiple SIMs/eSIMs of the wireless device 102 as a primary SIM/eSIM, and another SIM/eSIM as a secondary SIM/eSIM. The primary SIM/eSIM can be preferred for voice and data connections for applications in use on the wireless device 102. In some embodiments, the primary SIM/eSIM is designated as a default data SIM, while the secondary SIM/eSIM is designated as a non-default data SIM. The tunable antenna hardware 510 can be used to receive signals for both the primary SIM/eSIM and the secondary SIM/eSIM. The tunable antenna hardware 510 can be configured for different radio frequency (RF) bands to improve reception of wireless signals for the cellular wireless networks associated with the primary SIM/eSIM and the secondary SIM/eSIM. The wireless device 102 stores antenna tuner settings 514 to use with different RF bands individually and with combinations of concurrent RF bands applicable for the cellular wireless networks associated with the SIMs/eSIMs of the wireless device 102. The baseband radio frequency software module 508 of the wireless device 102 selects an antenna tuner setting 514 to adjust parameters of the tunable antenna hardware 510 based on applications that are using wireless connections via the primary SIM/eSIM, e.g., as indicated by the application status information 504, and based on cellular wireless network conditions, e.g., as indicated by the key performance indicators 512. In some cases, the baseband radio frequency software module 508 selects an antenna tuner setting 514 that improves (or biases) performance for the secondary SIM/eSIM when certain criteria are met, e.g., when i) a performance indicator for the cellular wireless network associated with the secondary SIM/eSIM does not satisfy a performance threshold, e.g., falls below a signal strength and/or signal quality threshold, ii) a corresponding performance indicator for the cellular wireless network associated with the primary SIM/eSIM does satisfy a corresponding performance threshold, e.g., equals/exceeds a corresponding signal strength and/or signal quality threshold, and iii) no applications that require a high performance criteria, e.g., a high data throughput and/or a high reliability, are currently active using the cellular wireless connections via the primary SIM/eSIM. When performance of cellular wireless connections via the primary SIM/eSIM can accommodate, at least temporarily, a minor degradation to allow performance of cellular wireless reception of signals via the secondary SIM/eSIM to improve, the baseband radio frequency software module 508 selects an antenna tuner setting 514 that favors the secondary SIM/eSIM.

Adjusting the tunable antenna hardware 510 to favor reception of wireless signals in a first RF band used by the primary SIM/eSIM can negatively impact reception of wireless signals, e.g., paging messages, in a second RF band used by the secondary SIM/eSIM. Moreover, adjusting the tunable antenna hardware 510 to balance reception of wireless signals in the first RF band and the second RF band can also impact reception in the second RF band, particularly when the wireless device 102 operates at a periphery of a serving cell of the second cellular wireless network associated with the secondary SIM/eSIM. Paging messages for the secondary SIM/eSIM sent by the second cellular wireless network in the second RF band can be missed by the wireless device 102 in far cell conditions, when the antenna hardware is not tuned to favor reception of signals in the second RF band. When the antenna hardware is tuned to favor reception of signals in the second RF band, performance of the communication in the first RF band for the primary SIM/eSIM can be impacted. As such, the wireless device 102 balances performance for reception of signals in the second RF band for the secondary SIM/eSIM when required, e.g., low signal strength/quality in the second RF band, and when a minor performance impact on signals in the first RF band for the primary SIM/eSIM can be accommodated, e.g., no high data throughput or uninterruptible applications are using connections of the primary SIM/eSIM in the first RF band.

The baseband radio frequency software module 508 of the wireless device 102 selects an antenna tuner setting 514 that covers radio frequency bands used by active SIMs/eSIMs on the wireless device 102. In some embodiments, the antenna tuner setting 514 is selected to boost performance for a secondary SIM/eSIM to improve a paging reception success rate. In some embodiments, the antenna tuner setting 514 is selected to favor reception of signals for the secondary SIM/eSIM when the wireless device 102 is operating at a periphery of a cell of a cellular wireless network associated with the secondary SIM/eSIM. In some embodiments, the antenna tuner setting 514 is selected to balance performance for the primary SIM/eSIM and the secondary SIM/eSIM. In some embodiments, the antenna tuner setting 514 is selected based on requirements for one or more applications actively using cellular wireless connections via the primary SIM/eSIM. For example, an application with an active cellular wireless connection using the primary SIM/eSIM and requiring a throughput above a data rate threshold or needing continuity of connection without interruption can be prioritized over reception of paging signals via the secondary SIM/eSIM. In some embodiments, the antenna tuner setting 514 is selected to favor reception for the secondary SIM/eSIM when required for performance of reception of paging messages for the secondary SIM/eSIM and communication via the primary SIM/eSIM can accommodate a reduction in performance for a period of time. In some embodiments, the antenna tuner setting 514 is selected to improve performance of reception for signals from a second cellular wireless network associated with the secondary SIM/eSIM when a first key performance indicator 512 for the first cellular wireless network associated with the primary SIM/eSIM is above a first performance threshold, a second key performance indicator 512 for the second cellular wireless network is below a second performance threshold, and all applications with active cellular wireless connections to the first cellular wireless network allow for a reduction in data throughput for a period of time. In some embodiments, the antenna tuner setting 514 is selected to favor reception of RF bands used by serving cells of the secondary SIM/eSIM over RF bands used by serving cells of the primary SIM/eSIM. In some embodiments, the antenna tuner setting 514 is selected to favor reception of RF bands for all serving cells of the primary SIM/eSIM and the secondary SIM/eSIM. In some embodiments, the antenna tuner setting 514 is selected to favor reception of RF bands for a primary serving cell of the primary SIM/eSIM and for RF bands used by serving cells of the secondary SIM/eSIM.

Figure 6:
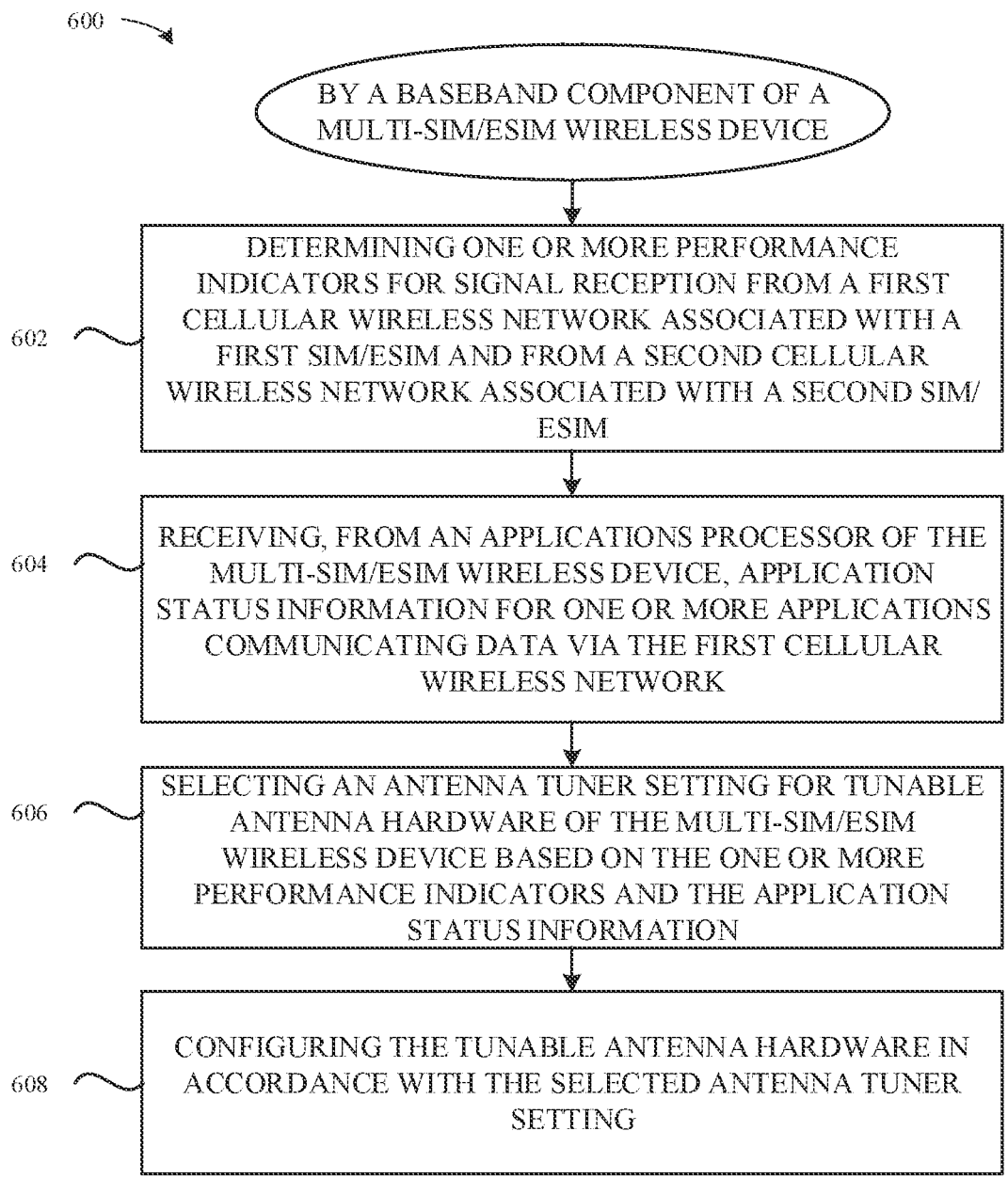
FIG. 6 illustrates a flow chart of an example of dynamic antenna tuner setting by a wireless device, according to some embodiments.

FIG. 6 illustrates a flow chart 600 of an example of dynamic antenna tuner setting by a baseband component 110 of a wireless device 102. At 602, the baseband component 110 determines one or more performance indicators 512 for signal reception from a first cellular wireless network associated with a first SIM/eSIM and from a second cellular wireless network associated with a second SIM/eSIM. At 604, the baseband component 110 receives, from an applications processor 502 of the wireless device 102, application status information 504 for one or more applications communicating data via the first cellular wireless network. At 606, the baseband component 110 selects an antenna tuner setting 514 for tunable antenna hardware 510 of the wireless device 102 based on the one or more performance indicators 512 and the application status information 504. At 608, the configures the tunable antenna hardware 510 in accordance with the selected antenna tuner setting 514. In some embodiments, the first SIM/eSIM is designated as a data-preferred SIM/eSIM and the second SIM/eSIM is designated as a non-data-preferred SIM/eSIM. In some embodiments, the first and second cellular wireless networks operate in different radio frequency (RF) bands.

In some embodiments, the baseband component 110 of the wireless device 102: i) obtains updated application status information 504 for the one or more applications communicating data via the first cellular wireless network; ii) selects an updated antenna tuner setting 514 for the tunable antenna hardware 510 of the wireless device 102 based on the updated application status information 504; and iii) re-configures the tunable antenna hardware 510 in accordance with the selected updated antenna tuner setting 514. In some embodiments, the application status information 504 indicates at least one application of the one or more applications communicating data via the first cellular wireless network requires data throughput above a high data throughput threshold, and the antenna tuner setting 514 balances performance for simultaneous communication via the first cellular wireless network and reception via the second cellular wireless network. In some embodiments: i) the application status information 504 indicates no application of the one or more applications communicating data via the first cellular wireless network requires data throughput above a high data throughput threshold, ii) a first performance indicator of the one or more performance indicators 512 indicates radio frequency reception via the first cellular wireless network satisfies a high performance threshold, iii) a second performance indicator of the one or more performance indicators 512 indicates radio frequency reception via the second cellular wireless network does not satisfy a low performance threshold, and iv) the antenna tuner setting 514 improves performance for reception via the second cellular wireless network and degrades communication via the first cellular wireless network. In some embodiments, the first performance indicator indicates a first reference signal received power (RSRP) level for signals received via the first cellular wireless network exceeds a first RSRP threshold, and the second performance indicator indicates a second RSRP level for signals received via the second cellular wireless network falls below a second RSRP threshold. In some embodiments, the first performance indicator indicates a first signal-to-interference-plus-noise ratio (SINR) value for signals received via the first cellular wireless network exceeds a first SINR threshold, and the second performance indicator indicates a second SINR level for signals received via the second cellular wireless network falls below a second SINR threshold. In some embodiments, the antenna tuner setting 514 balances performance for simultaneous communication via a primary cell of the first cellular wireless network and reception via the second cellular wireless network. In some embodiments, the first cellular wireless network operates in accordance with a 5G wireless communication protocol, and the second cellular wireless network operates in accordance with a 4G Long Term Evolution (LTE) wireless communication protocol. In some embodiments, the first cellular wireless network operates in accordance with a 5G wireless communication protocol using a frequency range 2 (FR2) RF band above 24 GHz, and the second cellular wireless network operates in accordance with a 5G wireless communication protocol using a frequency range 1 (FR1) RF band below 8 GHz.

Representative Exemplary Apparatus

Figure 7:
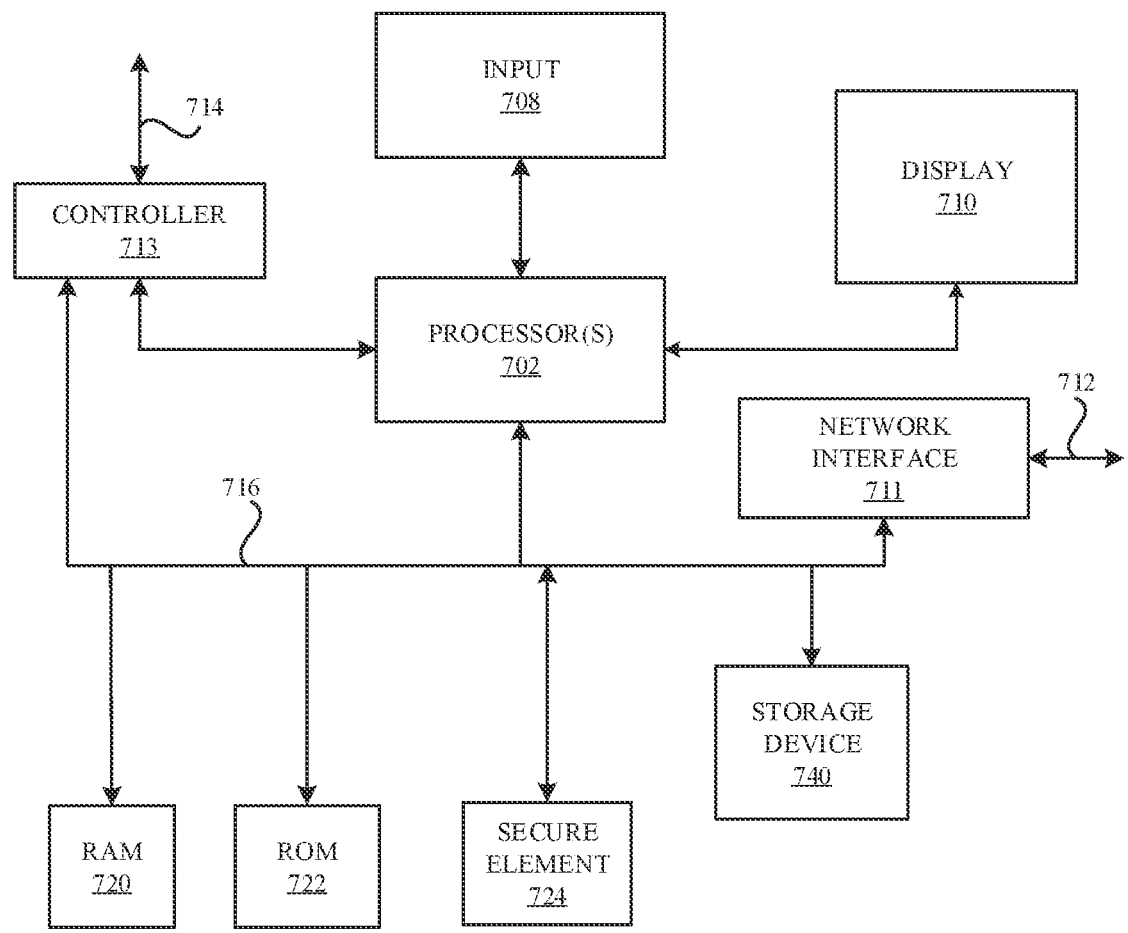
FIG. 7 illustrates a block diagram of exemplary elements of a wireless device, according to some embodiments.

FIG. 7 illustrates in block diagram format an exemplary computing device 700 that can be used to implement the various components and techniques described herein, according to some embodiments. In particular, the detailed view of the exemplary computing device 700 illustrates various components that can be included in the mobile wireless device 102. As shown in FIG. 7, the computing device 700 can include one or more processors 702 that represent microprocessors or controllers for controlling the overall operation of computing device 700. In some embodiments, the computing device 700 can also include a user input device 708 that allows a user of the computing device 700 to interact with the computing device 700. For example, in some embodiments, the user input device 708 can take a variety of forms, such as a button, keypad, dial, touch screen, audio input interface, visual/image capture input interface, input in the form of sensor data, etc. In some embodiments, the computing device 700 can include a display 710 (screen display) that can be controlled by the processor(s) 702 to display information to the user (for example, information relating to incoming, outgoing, or active communication sessions). A data bus 716 can facilitate data transfer between at least a storage device 740, the processor(s) 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include wireless circuitry, such as a wireless transceiver and/or baseband component. The computing device 700 can also include a secure element 724. The secure element 724 can include an eUICC 108 and/or one or more UICCs 118.

The computing device 700 also includes a storage device 740, which can include a single storage or a plurality of storages (e.g., hard drives and/or solid-state drives), and includes a storage management module that manages one or more partitions within the storage device 740. In some embodiments, storage device 740 can include flash memory, semiconductor (solid state) memory or the like. The computing device 700 can also include a Random-Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

Wireless Terminology

In accordance with various embodiments described herein, the terms "wireless communication device," "wireless device," "mobile device," "mobile station," "mobile wireless device," and "user equipment" (UE) may be used interchangeably herein to describe one or more consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near-field communication (NFC), a cellular wireless network, a fourth generation (4G) LTE, LTE Advanced (LTE-A), 5G, and/or 6G or other present or future developed advanced cellular wireless networks.

The wireless device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless devices that are also capable of communicating via different radio access technologies (RATs). In these scenarios, a multi-mode user equipment (UE) can be configured to prefer attachment to a 5G wireless network offering faster data rate throughput, as compared to other 4G LTE legacy networks offering lower data rate throughputs. For instance, in some implementations, a multi-mode UE may be configured to fall back to a 4G LTE network or a 3G legacy network, e.g., an Evolved High Speed Packet Access (HSPA+) network or a Code Division Multiple Access (CDMA) 2000 Evolution-Data Only (EV-DO) network, when 5G wireless networks are otherwise unavailable.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for dynamic antenna tuner setting by a multi-SIM/eSIM wireless device, the method comprising:
   by a baseband component of the multi-SIM/eSIM wireless device:
      determining one or more performance indicators for signal reception from a first cellular wireless network associated with a first SIM/eSIM and from a second cellular wireless network associated with a second SIM/eSIM;
      receiving, from an applications processor of the multi-SIM/eSIM wireless device, application status information for one or more applications communicating data via the first cellular wireless network;
      selecting an antenna tuner setting for tunable antenna hardware of the multi-SIM/eSIM wireless device based on the one or more performance indicators and the application status information; and
      configuring the tunable antenna hardware in accordance with the selected antenna tuner setting,
   wherein:
      the first SIM/eSIM is designated as a data-preferred SIM/eSIM and the second SIM/eSIM is designated as a non-data-preferred SIM/eSIM; and
      the first and second cellular wireless networks operate in different radio frequency (RF) bands.

2. The method of claim 1, further comprising:
   by the baseband component of the multi-SIM/eSIM wireless device:
      obtaining updated application status information for the one or more applications communicating data via the first cellular wireless network;

selecting an updated antenna tuner setting for the tunable antenna hardware of the multi-SIM/eSIM wireless device based on the updated application status information; and re-configuring the tunable antenna hardware in accordance with the selected updated antenna tuner setting.

3. The method of claim 1, wherein:
the application status information indicates at least one application of the one or more applications communicating data via the first cellular wireless network requires data throughput above a high data throughput threshold; and
the antenna tuner setting balances performance for simultaneous communication via the first cellular wireless network and reception via the second cellular wireless network.

4. The method of claim 1, wherein:
the application status information indicates no application of the one or more applications communicating data via the first cellular wireless network requires data throughput above a high data throughput threshold;
a first performance indicator of the one or more performance indicators indicates radio frequency reception via the first cellular wireless network satisfies a high performance threshold;
a second performance indicator of the one or more performance indicators indicates radio frequency reception via the second cellular wireless network does not satisfy a low performance threshold; and
the antenna tuner setting improves performance for reception via the second cellular wireless network and degrades communication via the first cellular wireless network.

5. The method of claim 4, wherein:
the first performance indicator indicates a first reference signal received power (RSRP) level for signals received via the first cellular wireless network exceeds a first RSRP threshold; and
the second performance indicator indicates a second RSRP level for signals received via the second cellular wireless network falls below a second RSRP threshold.

6. The method of claim 4, wherein:
the first performance indicator indicates a first signal-to-interference-plus-noise ratio (SINR) value for signals received via the first cellular wireless network exceeds a first SINR threshold; and
the second performance indicator indicates a second SINR level for signals received via the second cellular wireless network falls below a second SINR threshold.

7. The method of claim 1, wherein the antenna tuner setting balances performance for simultaneous communication via a primary cell of the first cellular wireless network and reception via the second cellular wireless network.

8. The method of claim 1, wherein:
the first cellular wireless network operates in accordance with a 5G wireless communication protocol; and
the second cellular wireless network operates in accordance with a 4G Long Term Evolution (LTE) wireless communication protocol.

9. The method of claim 1, wherein:
the first cellular wireless network operates in accordance with a 5G wireless communication protocol using a frequency range 2 (FR2) RF band above 24 GHz; and
the second cellular wireless network operates in accordance with a 5G wireless communication protocol using a frequency range 1 (FR1) RF band below 8 GHz.

10. A multi-SIM/eSIM wireless device configured for dynamic antenna tuner setting, the multi-SIM/eSIM wireless comprising:
a first SIM/eSIM configured as a data-preferred SIM/eSIM;
a second SIM/eSIM configured as a non-data-preferred SIM/eSIM;
tunable antenna hardware;
an applications processor; and
a baseband component communicatively coupled to the applications processor and to the tunable antenna hardware and configured to:
determine one or more performance indicators for signal reception from a first cellular wireless network associated with the first SIM/eSIM and from a second cellular wireless network associated with the second SIM/eSIM;
receive, from the applications processor, application status information for one or more applications communicating data via the first cellular wireless network;
select an antenna tuner setting for the tunable antenna hardware based on the one or more performance indicators and the application status information; and
configure the tunable antenna hardware in accordance with the selected antenna tuner setting,
wherein the first and second cellular wireless networks operate in different radio frequency (RF) bands.

11. The multi-SIM/eSIM wireless device of claim 10, wherein the baseband component is further configured to:
obtain, from the applications processor, updated application status information for the one or more applications communicating data via the first cellular wireless network;
select an updated antenna tuner setting for the tunable antenna hardware based on the updated application status information; and
re-configure the tunable antenna hardware in accordance with the selected updated antenna tuner setting.

12. The multi-SIM/eSIM wireless device of claim 10, wherein:
the application status information indicates at least one application of the one or more applications communicating data via the first cellular wireless network requires data throughput above a high data throughput threshold; and
the antenna tuner setting balances performance for simultaneous communication via the first cellular wireless network and reception via the second cellular wireless network.

13. The multi-SIM/eSIM wireless device of claim 10, wherein:
the application status information indicates no application of the one or more applications communicating data via the first cellular wireless network requires data throughput above a high data throughput threshold;
a first performance indicator of the one or more performance indicators indicates radio frequency reception via the first cellular wireless network satisfies a high performance threshold;
a second performance indicator of the one or more performance indicators indicates radio frequency reception via the second cellular wireless network does not satisfy a low performance threshold; and the antenna tuner setting improves performance for reception via the second cellular wireless network and degrades communication via the first cellular wireless network.

14. The multi-SIM/eSIM wireless device of claim 13, wherein:
the first performance indicator indicates a first reference signal received power (RSRP) level for signals received via the first cellular wireless network exceeds a first RSRP threshold; and
the second performance indicator indicates a second RSRP level for signals received via the second cellular wireless network falls below a second RSRP threshold.

15. The multi-SIM/eSIM wireless device of claim 13, wherein:
the first performance indicator indicates a first signal-to-interference-plus-noise ratio (SINR) value for signals received via the first cellular wireless network exceeds a first SINR threshold; and
the second performance indicator indicates a second SINR level for signals received via the second cellular wireless network falls below a second SINR threshold.

16. The multi-SIM/eSIM wireless device of claim 10, wherein the antenna tuner setting balances performance for simultaneous communication via a primary cell of the first cellular wireless network and reception via the second cellular wireless network.

17. The multi-SIM/eSIM wireless device of claim 10, wherein:
the first cellular wireless network operates in accordance with a 5G wireless communication protocol; and
the second cellular wireless network operates in accordance with a 4G Long Term Evolution (LTE) wireless communication protocol.

18. The multi-SIM/eSIM wireless device of claim 10, wherein:
the first cellular wireless network operates in accordance with a 5G wireless communication protocol using a frequency range 2 (FR2) RF band above 24 GHz; and
the second cellular wireless network operates in accordance with a 5G wireless communication protocol using a frequency range 1 (FR1) RF band below 8 GHz.

19. A non-transitory computer-readable medium storing instructions for dynamic antenna tuner setting by a multi-SIM/eSIM wireless device, the instructions comprising:
instructions for determining one or more performance indicators for signal reception from a first cellular wireless network associated with a first SIM/eSIM and from a second cellular wireless network associated with a second SIM/eSIM;
instructions for receiving, from an applications processor of the multi-SIM/eSIM wireless device, application status information for one or more applications communicating data via the first cellular wireless network;
instructions for selecting an antenna tuner setting for tunable antenna hardware of the multi-SIM/eSIM wireless device based on the one or more performance indicators and the application status information; and
instructions for configuring the tunable antenna hardware in accordance with the selected antenna tuner setting, wherein:
the first SIM/eSIM is designated as a data-preferred SIM/eSIM and the second SIM/eSIM is designated as a non-data-preferred SIM/eSIM; and
the first and second cellular wireless networks operate in different radio frequency (RF) bands.

20. The non-transitory computer-readable medium of claim 19, wherein:
the application status information indicates no application of the one or more applications communicating data via the first cellular wireless network requires data throughput above a high data throughput threshold;
a first performance indicator of the one or more performance indicators indicates radio frequency reception via the first cellular wireless network satisfies a high performance threshold;
a second performance indicator of the one or more performance indicators indicates radio frequency reception via the second cellular wireless network does not satisfy a low performance threshold; and
the antenna tuner setting improves performance for reception via the second cellular wireless network and degrades communication via the first cellular wireless network.

* * * * *